May 18, 1965

J. C. CALANDRA 3,184,382

METHOD OF PRODUCING TRANQUILIZATION BY
HYDROXY-LOWERALKYL-N-SUBSTITUTED
CARBAMIC ACID ESTERS

Filed Aug. 12, 1963

INVENTOR.
JOSEPH C. CALANDRA
BY
ATTORNEY.

3,184,382
METHOD OF PRODUCING TRANQUILIZATION BY
HYDROXY - LOWERALKYL - N - SUBSTITUTED
CARBAMIC ACID ESTERS
Joseph C. Calandra, Skokie, Ill., assignor to The Pure Oil
Company, Palatine, Ill., a corporation of Ohio
Filed Aug. 12, 1963, Ser. No. 301,284
18 Claims. (Cl. 167—65)

Various esters of carbamic acid are known to possess properties and characteristics which make them useful as pharmacological agents. The activity or effectiveness of organic compounds as pharmacological agents is, however, difficult to predict and the actual performance of one class of compounds for this purpose cannot form a basis on which to state with certainty that another class of similar compounds will also be effective. So little is known of the influence of functional groups on the pharmacological usefulness of different classes of compounds that research in this field has been practically limited to a trial and error technique. Accordingly, where the effectiveness of a group of compounds or the influence of a functional group on a class of compounds can be demonstrated by actual tests, an advancement in this art has been made. This application is a continuation-in-part of copending application Serial No. 176,483, filed February 20, 1962, now abandoned, the latter being a continuation-in-part of application Serial No. 781,608, filed December 19, 1958, now abandoned.

This invention is based on the discovery that a certain class of polar esters of carbamic acids, in which the ester group contains at least one polar substituent, are useful as pharmacological agents. More particularly, it has been found that a certain class of polar esters of carbamic acid, in which the ester group contains at least one polar substituent, are useful as pharmacological agents. More particularly, it has been found that a certain class of polar esters of carbamic acid, in which the ester group contains at least one polar substituent, such as, but not limited to, the polar esters of aralkyl carbamates having from 1 to 5 carbon atoms in the alkyl portion, are useful as anti-convulsants, muscle relaxants, tranquilizers, sedatives or hypnotics and anesthetics in the treatment of vertebrates including humans at a dosage of about 150 mg. to about 3300 mg. per day or more. These compounds may be used as anti-leukemia agents but this property has not been established.

Broadly, the pharmacological agents of this invention are represented by the following general Formulas I and II:

(I) 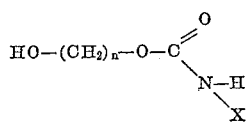

(II) 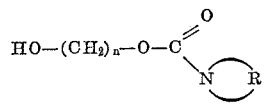

wherein, in Formula I, $n$ represents the numerals 2 through 5 inclusive, and X is an aralkyl radical having from 1 to 5 carbon atoms in the alkyl portion and having a phenyl or naphthyl group as the aryl portion thereof. Examples of aralkyl groups illustrating X in Formula I are benzyl, 1-phenylethyl, 2-phenylethyl, phenylisopropyl, phenyl normal propyl and isomers thereof, 2-phenyl-secondary butyl, 3-phenylamyl, naphthylmethyl, 1-naphthylethyl, 2-naphthylethyl, 2-naphthyl-sec-butyl, hydroxyphenyl, aminophenyl, and 3-naphthylamyl radicals, also including fluorophenyl and the like.

Included in the foregoing definition of X are the following radicals wherein phenyl may also be naphthyl:

3-phenyl-n-propyl

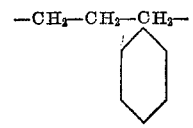

2-methyl-4-phenyl-n-butyl

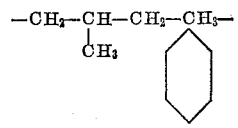

5-phenyl-n-amyl

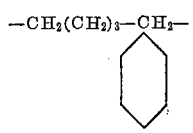

1-phenyl-n-propyl

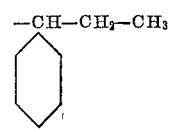

2-phenyl-n-propyl

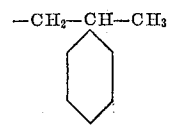

1-methyl-1-phenylethyl (2-phenylisopropyl)

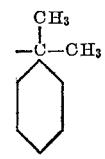

1-methyl-2-phenylethyl (1-phenylisopropyl)

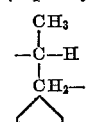

4-phenyl-n-butyl

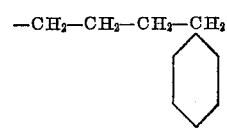

3-phenyl-n-butyl

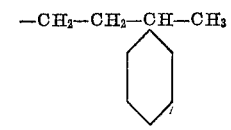

2-phenyl-n-butyl

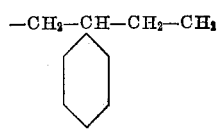

1-phenyl-n-butyl

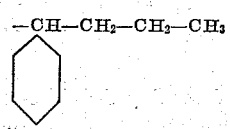

1-methyl-1-phenylpropyl (2-phenyl sec.-butyl)

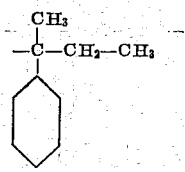

1-methyl-2-phenylpropyl (3-phenyl sec.-butyl)

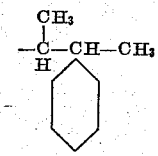

1-methyl-3-phenylpropyl (4-phenyl sec.-butyl)

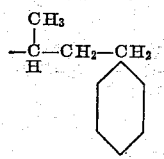

1-phenyl-2-sec.-butyl (1-benzyl-n-propyl)

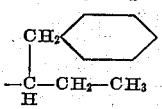

1,1-dimethyl-2-phenylethyl (phenyl tert.-butyl)
(1,1-dimethyl-1-benzylmethyl)

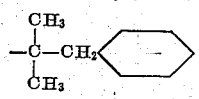

1-methyl-1-benzylethyl (phenyl tert.-butyl)

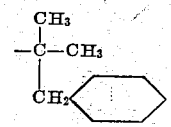

5-phenyl-n-amyl and also 4-phenyl-n-amyl,
3-phenyl-n-amyl, 2-phenyl-n-amyl, 1-phenyl-n-amyl

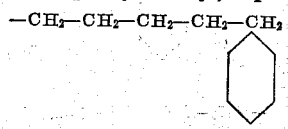

4-phenyl-1-methylbutyl

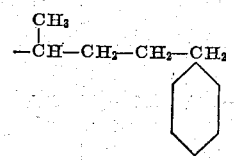

3-phenyl-1-methylbutyl

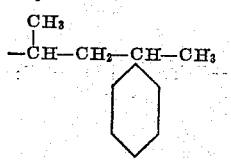

2-phenyl-1-methylbutyl

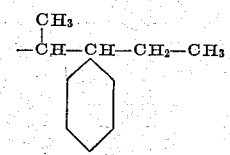

1-phenyl-1-methylbutyl

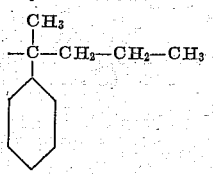

1-benzylbutyl

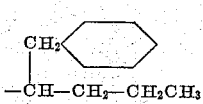

1-ethyl-3-phenylpropyl

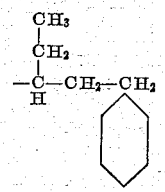

Di-ethylphenylmethyl

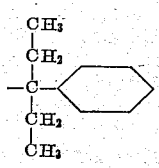

Benzyl

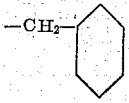

1-ethyl-2-phenylpropyl

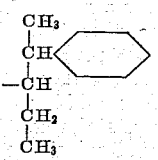

In Formula II, $n$ represents the numerals 2 through 5 inclusive and R is a divalent alkylene radical having as its essential part a hydrocarbon chain of at least 2 to 5 carbon atoms including cyclobutyl and cyclopentyl radicals. In Formula II the nitrogen and R groups form a heterocyclic ring.

Species of compounds coming within Formula I are:

2-hydroxyethyl-N-benzyl carbamate,
2-hydroxyethyl-N-1-phenylethyl carbamate,
2-hydroxyethyl-N-3-phenyl-n-propyl carbamate,
2-hydroxyethyl-N-4-phenyl-n-butyl carbamate,
2-hydroxyethyl-N-5-phenyl-n-amyl carbamate,
2-hydroxyethyl-N-1-phenyl-n-propyl carbamate,
2-hydroxyethyl-N-2-phenyl-n-propyl carbamate,
2-hydroxyethyl-N-1-methyl-1-phenylethyl carbamate,
2-hydroxyethyl-N-1-methyl-2-phenylethyl carbamate,
2-hydroxyethyl-N-4-phenyl-n-butyl carbamate,
2-hydroxyethyl-N-3-phenyl-n-butyl carbamate,
2-hydroxyethyl-N-2-phenyl-n-butyl carbamate,
2-hydroxyethyl-N-1-phenyl-n-butyl carbamate,
2-hydroxyethyl-N-1-methyl-1-phenylpropyl carbamate,
2-hydroxyethyl-N-1-methyl-2-phenylpropyl carbamate, 2-hydroxyethyl-N-1-methyl-3-phenylpropyl carbamate,
2-hydroxyethyl-N-1-phenyl-2-sec-butyl carbamate,
2-hydroxyethyl-N-1,1-dimethyl-2-phenylethyl carbamate,
2-hydroxyethyl-N-1-methyl-1-benzylethyl carbamate,
2-hydroxyethyl-N-5-phenyl-n-amyl carbamate,
2-hydroxyethyl-N-4-phenyl-n-amyl carbamate,
2-hydroxyethyl-N-3-phenyl-n-amyl carbamate,
2-hydroxyethyl-N-2-phenyl-n-amyl carbamate,
2-hydroxyethyl-N-1-phenyl-n-amyl carbamate,
2-hydroxyethyl-N-4-phenyl 1-methylbutyl carbamate,
2-hydroxyethyl-N-3-phenyl-1-methylbutyl carbamate,
2-hydroxyethyl-N-2-phenyl-1-methylbutyl carbamate,
2-hydroxyethyl-N-1-phenyl-1-methylbutyl carbamate,
2-hydroxyethyl-N-1-benzylbutyl carbamate,
2-hydroxyethyl-N-1-ethyl-3-phenylpropyl carbamate,
2-hydroxyethyl-N-di-ethylphenylmethyl carbamate,
2-hydroxyethyl-N-1-ethyl-2-phenylpropyl carbamate,
2-hydroxyethyl-N-3-naphthyl-n-propyl carbamate,
2-hydroxyethyl-N-4-naphthyl-n-butyl carbamate,
2-hydroxyethyl-N-5-naphthyl-n-amyl carbamate,
2-hydroxyethyl-N-1-naphthyl-n-propyl carbamate,
2-hydroxyethyl-N-2-naphthyl-n-propyl carbamate,
2-hydroxyethyl-N-1-methyl-1-naphthylethyl carbamate,
2-hydroxyethyl-N-1-methyl-2-naphthylethyl carbamate,
2-hydroxyethyl-N-4-naphthyl-n-butyl carbamate,
2-hydroxyethyl-N-3-naphthyl-n-butyl carbamate,
2-hydroxyethyl-N-2-naphthyl-n-butyl carbamate,
2-hydroxyethyl-N-1-naphthyl-n-butyl carbamate,
2-hydroxyethyl-N-1-methyl-1-naphthylpropyl carbamate,
2-hydroxyethyl-N-1-methyl-2-naphthylpropyl carbamate,
2-hydroxyethyl-N-1-methyl-3-naphthylpropyl carbamate,
2-hydroxyethyl-N-1-naphthyl-2-sec-butyl carbamate,
2 - hydroxyethyl-N-1,1-dimethyl-2-naphthylethyl carbamate,
2-hydroxyethyl-N-5-naphthyl-n-amyl carbamate,
2-hydroxyethyl-N-4-naphthyl-n-amyl carbamate,
2-hydroxyethyl-N-3-naphthyl-n-amyl carbamate,
2-hydroxyethyl-N-2-naphthyl-n-amyl carbamate,
2-hydroxyethyl-N-1-naphthyl-n-amyl carbamate,
2-hydroxyethyl-N-4-naphthyl-1-methylbutyl carbamate,
3-hydroxypropyl-N-benzyl carbamate,
3-hydroxypropyl-N-1-phenylethyl carbamate,
4-hydroxybutyl-n-benzyl carbamate,
4-hydroxybutyl-N-1-phenylethyl carbamate,
5-hydroxyamyl-N-benzyl carbamate,
5-hydroxyamyl-N-1-phenylethyl carbamate,
2-hydroxyethyl-N-2-phenylethyl carbamate,
3-hydroxypropyl-N-2-phenylethyl carbamate,
4-hydroxybutyl-N-2-phenylethyl carbamate,
5-hydroxyamyl-N-2-phenylethyl carbamate,
2-hydroxyethyl-N-2-phenylsec-butyl carbamate,
3-hydroxypropyl-N-2-phenylsec-butyl carbamate,
4-hydroxybutyl-N-2-phenylsec-butyl carbamate,
5-hydroxyamyl-N-2-phenylsec-butyl carbamate,
2-hydroxyethyl-N-naphthylmethyl carbamate,
3-hydroxypropyl-N-naphthylmethyl carbamate,
4-hydroxybutyl-N-naphthylmethyl carbamate,
5-hydroxyamyl-N-naphthylmethyl carbamate,
2-hydroxyethyl-N-3-naphthylamyl carbamate,
2-hydroxyethyl-N-2-naphthylethyl carbamate,
2-hydroxyethyl-N-1-naphthylethyl carbamate,
and 2-hydroxyethyl-N-2-naphthylsec-butyl carbamate.

Particular preferred species under Formula I are:

2-hydroxyethyl-N-2-phenyl-n-propyl carbamate

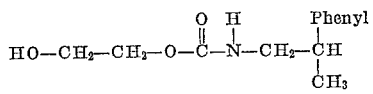

2-hydroxyethyl-N-1-methyl-2-phenylethyl carbamate

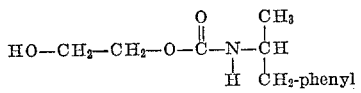

2-hydroxyethyl-N-1-methyl-1-phenylethyl carbamate

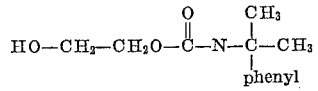

2-hydroxyethyl-N-3-phenyl-n-propyl carbamate

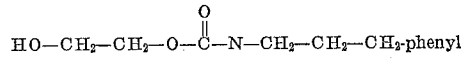

2-hydroxyethyl-N-1-phenyl-n-propyl carbamate

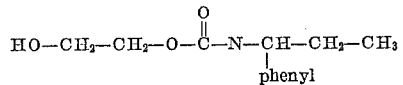

Species of compounds coming under Formula II are:

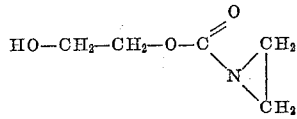

2-hydroxyethylethyleneiminocarboxylate

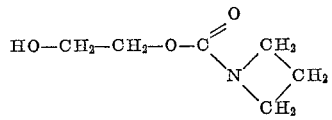

2-hydroxyethyltrimethylene iminocarboxylate

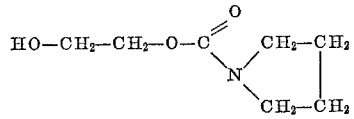

2-hydroxyethyl-N-pyrrolidinyl carbamate

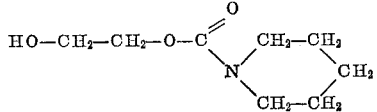

2-hydroxyethyl-N-piperidinyl carbamate

Within the broad definition of the invention there are species which will not possess pharmacological effectiveness in the same or other areas of utility equivalent to the more active species which are used herein to demonstrate the invention. Also, the areas of utility within the pharmacological activity of all species included in the broad definition will vary. Accordingly, although a somewhat restricted area of utility will be demonstrated for certain species, it is to be understood that this demonstration in the field of pharmacology is a good indication that the compounds generally and other species will have utility in other areas of application although the manner of administration may differ or the results detected by applying different techniques.

Accordingly, it becomes a primary object of this invention to provide a method of inducing tranquility in humans using new classes of pharmacological agents within the genus of carbamates at a dosage of about 150 to about 3300 mg./day.

Another object of the invention is to provide a method of inducing tranquility in vertebrates including humans by administering hydroxy esters of carbamic acid.

A further object of the invention is to provide a method of counteracting convulsions in vertebrates by administering compositions containing hydroxy esters of carbamic acid.

Another object of the invention is to provide a method of counteracting convulsions and inducing tranquility in vertebrates including humans by administering intraperitoneally about 150 to about 3300 mg./day of hydroxy esters of carbamic acids having a benzyl group attached to the nitrogen atom.

Still another object of the invention is to provide a method of counteracting convulsions and inducing tranquility in vertebrates including humans which comprises administering intraperitoneally about 150 to about 3300 mg./day of hydroxy esters of carbamic acids having a piperidinyl group attached to the nitrogen atom.

Another object of the invention is to provide a method of counteracting convulsions and inducing tranquility in vertebrates including humans by administering about 150 to about 3300 mg./day of 2-hydroxyethyl-N-benzyl carbamate.

Still another object of the invention is to provide a method of counteracting convulsions and inducing tranquility in vertebrates by administering 2-hydroxyethyl-N-piperidinyl carbamates.

A further object of this invention is to provide a method of inducing tranquility in vertebrates by administering compounds of the group consisting of 2-hydroxyethyl-N-benzyl carbamate
2-hydroxyethyl-N-piperidinyl carbamate
2-hydroxyethyl-N-phenylethyl carbamate
2-hydroxyethyl-N-2-phenyl-n-propyl carbamate
2-hydroxyethyl-N-1-methyl-2-phenylethyl carbamate
2-hydroxyethyl-N-1-methyl-1-phenylethyl carbamate
2-hydroxyethyl-N-3-phenyl-n-propyl carbamate and
2-hydroxyethyl-N-1-phenyl-n-propyl carbamate The invention will be demonstrated by reference to a number of experiments and the attached drawings wherein:

Figure 1:
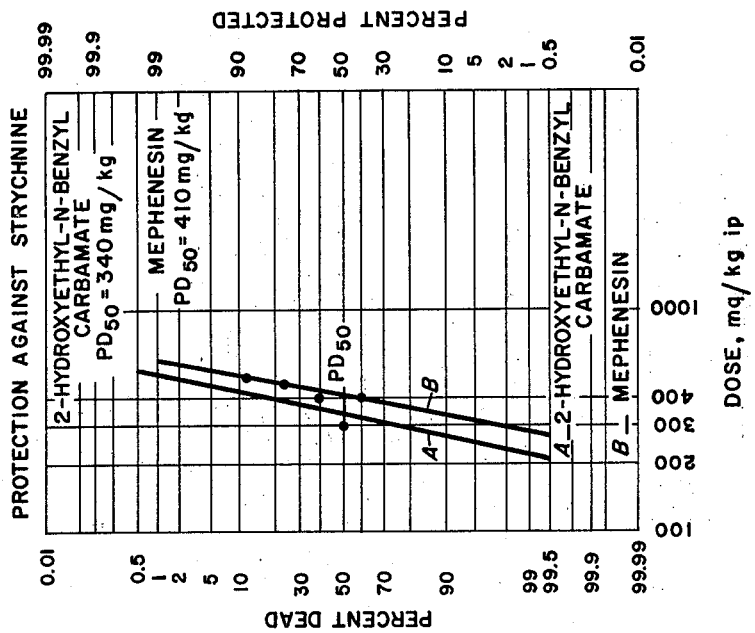
FIGURE 1 is a logarithmic probability graph comparing the effectiveness of 2-hydroxyethyl-N-benzyl carbamate (line A) with mephenesin (line B) as anti-convulsants induced by strychnine and metrazol.

The tests performed herein evaluate the anti-convulsive properties of certain species of carbamates under the generic formula by inducing convulsions in test animals by stimulation with strychnine ($C_{21}H_{22}O_2N_2$) and metrazol ($C_5H_{10}N_4$, pentamethylenetetrazol) and comparing their effectiveness with that of a known drug which is clinically used as an anti-convulsant or muscle relaxant. Strychnine and metrazol are known to stimulate the central nervous system and, in sufficient dosage, cause fatal convulsions. As a basis of comparison, the ability of the carbamates of this invention to overcome such induced convulsions or prevent death as a result thereof, is tested with mephenesin which is 3-o-tolyloxy 1,2-propandiol.

Before proceeding to test the anti-convulsive properties of the test compounds and the comparison standard of mephenesin, the $LD_{100}$ doses (100 percent lethal dose, i.e., the minimum dose level at which all of the animals injected died) of the convulsant compounds were determined. In each case, groups of ten animals were injected intra-peritoneally with doses of the two convulsant agents. The $LD_{100}$ of strychnine sulfate was found to be 3.0 mg./kg. body weight with convulsion ensuing within one to three minutes. The $LD_{100}$ dose of metrazol given intraperitoneally was established at 100 mg./kg. with convulsions starting within one minute.

In making the $LD_{100}$ tests and the following tests, Swiss male albino mice having 25 grams body weight were used as the test animals. In the following experiments the test animals were first injected intra-peritoneally with various dosages of the test carbamates fiifteen (15) minutes prior to the injection of $LD_{100}$ dosages of strychnine sulfate or metrazol.

PROTECTION AGAINST STRYCHNINE CONVULSIONS 2-hydroxyethyl-N-morpholinyl carbamate, at a dose of 400 mg./kg., did not show any significant effect on the posture of the animals and did not afford any observable protection against strychnine. Convulsions occurred without delay, and the seizure pattern was very similar to that observed with control animals. 2-hydroxyethyl-N-piperidinyl carbamate, at a dose of 400 mg./kg., did not affect animal posture to any significant extent. While protection against lethal doses of strychnine was insignificant (the mortality observed was 100 percent), the occurrence of death was delayed in seven cases up to ten minutes while three deaths occurred within 10 to 20 minutes after injection (10 animals were tested). Thus, mild anti-convulsive activity was observed.

At a dose level of 400 mg./kg. of 2-hydroxyethyl-N-benzyl carbamate, the animals tested showed some loss in posture. The first strychnine-induced convulsions appeared in about five minutes, which represented a delay in comparison to the untreated animals. Only four deaths occurred in ten test animals; the majority of surviving animals appeared normal within 1.5 hours after injection. This carbamate was also tested at a dose level of 300 mg./kg. Results of tests at both dose levels are shown in Table I and in FIGURE 1. All of the tests herein were conducted using normal saline solutions.

*Table I*

2-HYDROXYETHYL-N-BENZYL CARBAMATE PROTECTION AGAINST STRYCHNINE

[Dose of strychnine sulfate, 3 mg./kg. I.P.]

| Dose of test carbamate, mg./kg. | Number of animals | Number of deaths | Percent protected |
|---|---|---|---|
| 300 | 10 | 5 | 50 |
| 400 | 10 | 4 | 60 |

Protective dose$_{50}$=340 mg./kg.

At a mephenesin dose level of 400 mg./kg., convulsions occurred within 10 to 15 minutes after strychnine injection; with higher doses they appeared to be more delayed. Deaths occurred after approximately one hour, while those animals that survived appeared to be normal within 1.5 hours after strychnine injection. Two of the animals injected with mephenesin at 450 and 500 mg./kg. dose levels died before strychnine was injected, indicating that the $LD_{50}$ of the mephenesin was being approached. The results of mephenesin tests are shown in Table II and FIGURE I.

*Table II*

MEPHENESIN PROTECTION AGAINST STRYCHNINE

[Dose of strychnine sulfate, 3 mg./kg. I.P.]

| Dose of mephenesin, mg./kg. | Number of animals | Number of deaths | Percent protected |
|---|---|---|---|
| 400 | 10 | 6 | 40.0 |
| 450 | 8 | 2 | 75.0 |
| 500 | 8 | 1 | 87.5 |

Protective Dose$_{50}$=410 mg./kg.

The comparison of the anti-strychnine activities of 2-hydroxyethyl-N-benzyl carbamate and mephenesin (see FIGURE 1) shows the first compound to be more effective on a weight basis. Furthermore, the carbamate protected protected animals at dose levels which were well below its lethal dose level, while the PD$_{50}$ of mephenesin appeared to be very close to its LD$_{50}$.

PROTECTION AGAINST METRAZOL-INDUCED CONVULSIONS

The extents of protection afforded by mephenesin and 2-hydroxyethyl-N-benzyl carbamate against convulsions induced by metrazol injection were also determined. Results of the mephenesin tests are shown in Table III and FIGURE 2.

Table III
MEPHENESIN PROTECTION AGAINST METRAZOL
[Dose of metrazol, 100 mg./kg. I.P.]

| Dose of mephenesin, mg./kg. | Number of animals | Number of deaths | Percent protected |
|---|---|---|---|
| 400 | 10 | 7 | 30 |
| 420 | 10 | 6 | 40 |

Protective Dose$_{50}$=440 mg./kg.

Figure 2:
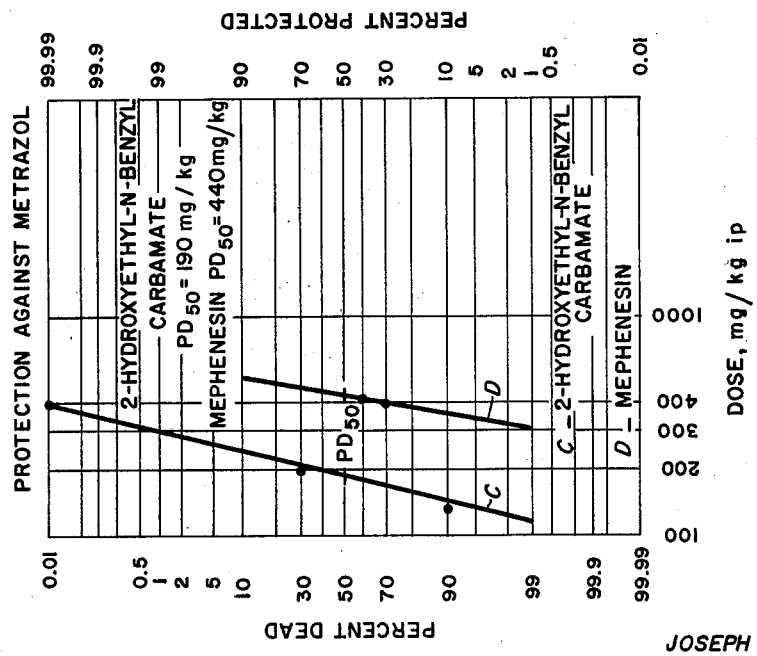
FIGURE 2 is a logarithmic probability graph comparing the effectiveness of 2-hydroxyethyl-N-benzyl carbamate (line C) with mephenesin as anti-convulsants induced by metrazol (line D).

Results of the carbamate tests are shown in Table IV and FIGURE 2.

Table IV
2-HYDROXYETHYL-N-BENZYL CARBAMATE PROTECTION AGAINST METRAZOL
[Dose of metrazol, 100 mg./kg. I.P.]

| Dose of test carbamate, mg./kg. | Number of animals | Number of deaths | Percent protected |
|---|---|---|---|
| 60 | 10 | 10 | 0 |
| 140 | 10 | 9 | 10 |
| 200 | 10 | 3 | 70 |
| 400 | 10 | 0 | 100 |

Protective Dose$_{50}$=190 mg./kg.

At mephenesin dose levels of 400 and 420 mg./kg., the injection of metrazol did not cause any significant convulsions for some time except for a few twitches of the extremities. Following a 30 to 40 minutes latent period, convulsions began to appear, the animals exhibited Straub-tail effect, and mouth bleeding was common. Surviving animals appeared to have returned to normal after two to three hours; most of the deaths occurred within one to one and one-half hours after metrazol injection.

At a 2-hydroxyethyl-N-benzyl carbamate dose level of 400 mg./kg., clonic convulsions occurred two minutes after metrazol injection. Animals showed distinctive hyperactivity, automatic leg movements, jumping, and Straub-tail effect. Hyperactivity continued for about two hours, but no deaths occurred at this dose level, at lower dose levels there was proportionately less protection as evidenced by the severity of convulsions and the shortening of survival times.

The superiority of 2-hydroxyethyl-N-benzyl carbamate over mephenesin in protecting against metrazol-induced convulsions is demonstrated by FIGURE 2. The PD$_{50}$ of mephenesin was 440 mg./kg.

The foregoing tests have shown that 2-hydroxyethyl-N-benzyl carbamate has superior anti-convulsive properties, that 2-hydroxyethyl-N-piperidinyl carbamate had mild but effective anti-convulsive activity and 2-hydroxyethyl-N-morphinyl carbamate has no observable protection against strychnine-induced convulsions.

Hydroxy esters of carbamic acid coming within the scope of this invention are readily prepared by the reaction of a suitable cyclic glycol carbonate with an amine such as benzylamine or piperidine to illustrate the preferred examples. Thus 2-hydroxyethyl-N-benzyl carbamate is prepared by gradually introducing about 500 gms. of benzylamine and about 400 gms. of cyclic carbonate of glycol into a vessel equipped with a stirrer and which is jacketed so that the temperature can be maintained at about 40° C. during initial mixing. The reaction mixture is maintained at 40° to 50° C. for about 10–12 hours. A white crystalline mass of 2-hydroxy-ethyl-N-benzyl carbamate settles out on cooling the mixture. After purification by repeated recrystallizations, the product has a melting point of about 40° C. By a similar reaction, piperidine is reacted with cyclic carbonate of glycol to form 2-hydroxyethyl-N-piperidinyl carbamate. This product is distilled at reduced pressure and boils at 161–162° C. under a pressure of 15 mm. of mercury. Substituting piperazine hydrate for piperidine and doubling the mole ratio used with the glycol carbonate produces 2-hydroxyethylpiperazine dicarbamate which may also be used as an anti-convulsant.

The process of administering the hydroxy alkyl esters of N-aralkyl carbamates of this invention may be conducted by treating the living organism, animal organism, mammalian or vertebrate animal or human being with compositions containing the carbamates or properly buffered solutions of the carbamates in safe therapeutic dosages. The carbamates of this invention may be administered orally, intra-peritoneally, intra-muscularly, intravenously or by other known routes. Various types of carrier vehicles may be used, including normal saline solutions, and other properly buffered aqueous vehicles. The concentrations used should be below lethal dosage as indicated from the experiments. When oral administration is used the carbamates may be tableted with starch or lactose in the known manner and using various proportions of ingredients for different dosages as desired.

In order to establish the tranquilizing and anti-convulsant properties of the compounds coming within the scope of the invention, clinical tests were conducted by an independent clinic on 18 patients using 2-hydroxyethyl-N-benzyl carbamate. In this series of tests the average effective dose was 60 mg. Q.I.D. (4 times daily). The largest effective dose used was 120 mg. Q.I.D. and the smallest effective dose was 60 mg. T.I.D. (3 times daily). The results are shown in the following table which indicates the other drugs with which the patients had been treated prior to the clinical tests, the diagnosis of each patient, the electroencephalogram reading for each patient, the duration of treatment and the clinical results.

Table V

| Other drugs | Patient | Diagnosis | EEG | Duration of treatment | Results |
|---|---|---|---|---|---|
| Celontin | 1 | Hypothalamic seizures | 14+6 per second pos. spikes | 3 mos | Excellent. |
| | 2 | Petit mal | 2+3 per second spike and wave | 2 mos | Poor. |
| | 3 | do | 2+3 per second spike and wave | 3 mos | Excellent. |
| | 4 | do | 4+6/sec | 2 mos | Good. |
| | 5 | do | 4+6/sec | 3 mos | Do. |
| | 6 | do | 4+6/sec | 3 mos | Excellent. |
| | 7 | do | 2+3/sec | 1 mo | Good. |
| Dilantin | 8 | Grand mal | Spike and wave multiple rapid spike foci | 2 mos | Fair. |
| | 9 | Infantile myoclonic spasms | Hypsarrhythmia | 12 weeks | Good. |
| Gemonil | 10 | do | do | 12 weeks | Do. |
| | 11 | Grand mal | Rapid spikes, diffuse | 12 weeks | Poor. |
| Phenobarbital | 12 | Grand mal and Petit mal | Mixed dysrhythmia | 2 mos | Fair. |
| Dilantin | 13 | Petit mal variant Grand mal | Diffuse dysrhythmia | 2 mos | Poor. |
| | 14 | Hypothalamic seizures | 14+6/sec pos. spikes | 4 mos | Excellent. |
| | 15 | Grand mal | Diffuse rapid spikes | 2 wks | No follow up. |
| | 16 | Hypothalamic seizures | 14+6/sec pos. spikes | 3 mos | Excellent. |
| | 17 | Hyperkinetic syndrome | Nonspecific dysrhythmia 4+7/sec | 2 mos | Do. |
| | 18 | do | Non-spec. dysrhythmia | 3 mos | Do. |

The results of these tests indicate a reliable effectiveness in hypothalamic seizures, good results in petit mal and the hyperkinetic syndrome. The results with regard to grand mal and infantile myoclonic spasms are encouraging. None of the patients treated showed any ill effects or evidences of toxicity during treatment.

The drug Celontin (a proprietary product) with which patient No. 2 had previously been treated is N,2-phenyl-succinimide having the formula $C_{12}H_{13}NO_2$ and a molecular weight of 203.23. The known medical use for this drug is the treatment of petit mal and psychomotor epilepsy.

The drug Dilantin (a proprietary product) with which patient Nos. 8 and 13 had previously been treated is 5,5-diphenylhydantoin sodium having the formula $$C_{15}H_{11}N_2O_2Na$$

and a molecular weight of 274.25. This drug is commonly used as an anticonvulsant for grand mal epilepsy.

The drug Gemonil (a proprietary product) previously used for patient No. 10 is 5,5-diethyl-1-methylbarbituric acid having the formula $C_9H_{14}N_2O_3$ and a molecular weight of 198.22. This drug is an anticonvulsant which is effective in controlling seizure phenomena associated with organic brain disease.

The drug Phenobarbital (a proprietary product) previously used by patent No. 12 is 5-ethyl-5-phenylbarbituric acid having the formula $C_{12}H_{12}N_2O_3$ and a molecular weight of 232.23.

Fifty-four patients in the pediatric age group were treated over a one-year period at the Pediatric Neurology Clinic of Mercy Hospital in Chicago, Illinois. Eleven of the patients had hypothalamic seizures, thirteen had petit mal seizures, six had infantile myoclonic seizures, six had grand mal seizures, three had psychomotor seizures and fifteen had the so-called hyperkinetic syndrome. All patients were administered the compounds of this invention in doses ranging from 200 to 1600 mg. per day in three to four divided doses.

All patients had weekly urinalyses and complete blood counts for the first six months and bi-weekly determinations for the second six months of therapy. Monthly liver function examination, by means of cephalin flocculation and/or bromsulfalein excretion tests, was also carried out. Careful interval histories were taken at each examination and untoward reactions such as skin eruptions and gastrointestinal complaints were promptly investigated.

Results are summarized in Table VI.

Table VI

CUMULATIVE RESULTS

[Use of 2-hydroxyethyl-n-benzyl carbamate for a 12-month period]

| | No. patients treated | Avg. length of therapy | Results | |
|---|---|---|---|---|
| Hypothalamic seizures (6 and 14 per second positive spikes on EEG). | 11 | 6 mos | Excellent<br>Good<br>Fair<br>Poor | 10<br>1<br>0<br>0 |
| Petit mal seizures (3 per second spike and wave pattern on EEG). | 13 | 8 mos | Excellent<br>Good<br>Fair<br>Poor | 6<br>4<br>2<br>1 |
| Infantile myoclonic seizures (Hypsarrhythmia on EEG). | 6 | 6 mos | Excellent<br>Good<br>Fair<br>Poor | 0<br>2<br>3<br>1 |

[All patients with Hypsarrhythmia were given a course of ACTH, in addition to 2-hydroxyethyl-n-benzyl carbamate. The combination appeared to be superior to ACTH alone]

| | No. patients treated | Avg. length of therapy | Results | |
|---|---|---|---|---|
| Hyperkinetic syndrome (non-specific dysrthythmia or no abnormality on the EEG). | 15 | 8 mos | Excellent<br>Good<br>Fair<br>Poor | 9<br>5<br>1<br>0 |
| Grand mal seizures (Rapid spike patterns on EEG). | 6 | 2 mos | Excellent<br>Good<br>Fair<br>Poor | 0<br>0<br>1<br>5 |

[2 cases were thought to have been aggravated by 2-hydroxyethyl-n-benzyl carbamate]

| | No. patients treated | Avg. length of therapy | Results | |
|---|---|---|---|---|
| Psychomotor seizures (anterior temporal focus on EEG). | 3 | 2 mos | Excellent<br>Good<br>Fair<br>Poor | 0<br>0<br>1<br>2 |

The drug demonstrated a striking effectiveness in hypothalamic seizures and the hyperkinetic syndrome. Hypothalamic seizures have a good prognosis as to improvement with advancing age but control is important both to avoid unnecessary therapy for psychosomatic equivalents which accompany this disorder and also to avoid the serious behavior disorders which may characterize these seizures. The dramatic effect of the compounds of this invention may best be illustrated by the following case of hypothalamic dysfunction.

A 12-year-old white male whose electroencephalogram showed 14 and 6 percent positive spikes was given a course of 100 mg. of diphenylhydantoin four times daily for 2 weeks without improvement. He was started on 2-hydroxyethyl-N-benzyl carbamate, 400 mg. four times a day with dramatic improvement. Reduction of the 2-hydroxyethyl-N-benzyl carbamate to 200 mg. three times a day resulted in partial return of symptoms. Since being on therapy, the boy has returned to normal health.

In another clinical case a ten-year-old girl had intermittent abdominal pains lasting from minutes to half an hour. These pains came on suddenly causing the patient to double up. An appendectomy revealed a normal appendix and the symptoms continued unabated. She was placed on 100 mgms. of Dilantin in the morning and 100 mgms. at bedtime along with 32 mgms. of Phenobarbital at bedtime which did reduce the frequency and severity of her attacks. The Dilantin was gradually increased in 25 mgm. increments until she was taking 400 mgms. of Dilantin a day and 64 mgms. of Phenobarbital at bedtime, same being the maximal dosages she could tolerate. On this dosage the pains were no less than they had been on the original amount and continued so severe that she was unable to attend school. Her electroencephalographic tracing showed frequent bursts of 14 and 6 percent positive spiking in the right or left temporal occipital areas in sleep.

She was started on 100 mgms. of 2-hydroxyethyl-N-benzyl carbamate three times a day and since this treatment she has attended school and experiences only mild discomfort. There was also a marked change in the appearance of the child and all evidence of pain vanished after one week of treatment. The Dilantin was gradually reduced to only 100 mgms. in the morning and at bedtime. This reduction was continued while the dosage of 2-hydroxyethyl-N-benzyl carbamate was increased to 100 mgms. four times a day with no signs of recurrence of the pain and otherwise completely normal and healthy symptoms being apparent.

From the tests on laboratory animals and the confirmatory tests on humans the utility of the compounds of this invention for the purpose of counteracting convulsions and inducing tranquility in vertebrates has been demonstrated, particularly in relation to the relief of hypothalamic seizures, petit mal and hyperkinetic syndrome in humans when administered in multiple doses at total dosages of about 150 to about 3300 mg./day and preferably at a total dosage of about 180 to about 2000 mg./day. For some patients a dosage of about 50 to 60 mg. administered three times daily will suffice and in others a dosage of about 120 mg. administered four times daily will be necessary. The average patient will respond to a dosage of about 60 mg. administered four times a day. The foregoing considerations of dosage also apply to patients suffering from grand mal and infantile nyoclonic spasms. These total dosages for humans may be increased beyond 2000 mg. per day to as high as 3300 mg. per day (or about 50 grains per day) to induce tranquility in severe cases without danger of toxicity or other after effects. A minimum dosage unit of about 25 mg. can be used.

The embodiments of the invention in which an exclusive property or privilege is claimed are defined as follows:

1. The method of inducing tranquility in vertebrates which comprises administering about 150 to about 3300 mg./day of compounds of the group consisting of hydroxy alkyl esters of N-substituted carbamates of the formulae (I)
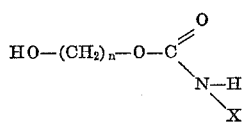

wherein $n$ is an integer of from 2 to 5 and X is a member of the group consisting of phenylalkyl and naphthalkyl having from 1 to 5 carbon atoms in the alkyl and (II)
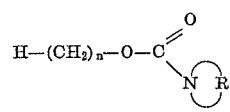

wherein $n$ is an integer of from 2 to 5 and R is divalent alkylene of 2 to 5 carbon atoms.

2. The method in accordance with claim 1 in which, in Formula I, X is benzyl.
3. The method in accordance with claim 1 in which, in Formula II, R is cyclopentyl.
4. The method in accordance with claim 1 in which, in Formula I, $n$ is 2 and X is benzyl.
5. The method in accordance with claim 1 in which, in Formula II, $n$ is 2 and R is cyclopentyl.
6. The method in accordance with claim 1 in which, in Formula I, X is 1-phenylethyl.
7. The method in accordance with claim 1 in which, in Formula I, X is 2-phenylethyl.
8. The method in accordance with claim 1 in which, in Formula I, X is phenyl n-propyl.
9. The method in accordance with claim 1 in which, in Formula I, X is phenyl isopropyl.
10. The method in accordance with claim 1 in which, in Formula I, X is 1-methyl-2-phenylethyl.
11. The method in accordance with claim 1 in which, in Formula I, X is 1-methyl-1-phenylethyl.
12. The method in accordance with claim 1 in which, in Formula I, X is 1-methyl-2-phenylethyl.
13. The method in accordance with claim 1 in which said compounds are administered at a dosage of about 150 to about 3300 mg./day.
14. The method in accordance with claim 13 in which said compounds are administered at a dosage of about 60 mg. to about 825 mg. 3 to 4 times daily.
15. The method of inducing tranquility in humans which comprises administering about 150 to about 3300 mg./day of 2-hydroxyethyl-N-benzyl carbamate.
16. The method in accordance with claim 15 in which said dosages are administered at a dosage of 60 mg. to 825 mg. 3 to 4 times daily.
17. The method of inducing tranquility in humans which comprises administering about 150 to 3300 mg./day of 2-hydroxyethyl-N-piperidinyl carbamate.
18. The method in accordance with claim 17 in which said doses are administered at a dosage of 60 mg. to 825 mg. 3 to 4 times daily.

References Cited by the Examiner

UNITED STATES PATENTS 2,697,720  12/54  Kaiser _____ 260—471
2,703,810  3/8   Viard _____ 260—471

OTHER REFERENCES

Laurence: British Med. J., Mar. 22, 1958, pp. 700–702, 167–65.
Charonnat: Ann. Pharm. Franc., vol. 11, 1953, pp. 409–414, as obtained through Chem. Abst., vol. 47, 1953, page 13759.
Hazard: Ann. Franc., vol. 9, 1951, pp. 390–397, as obtained through Chem. Abst., vol. 46, 1952, p. 1160.
Seevers: U. Mich. Bull. September 1957, p. 53.
American Druggist, Mar. 24, 1957, p. 53.
Amer. Jour. Pharm., January 1955, pp. 14–15.
Goodwin: The Pharmaceutical J. vol. 181, No. 4952, Sept. 27, 1958, pp. 233–235.
Riley: The J. of Pharm. and Pharmacol., November 1958, pp. 657–671.
Aacra: Arch. Int. Pharm. XVIII, Nos.1–2, pp. 1–8, 1958.
Toman: Vol. 28, pp. 409–432, October 1948.
Weaver: J. Am. Pharm. Assoc., vol. 47, No. 9, pp. 645–648, September 1958.
Slater: J. of Pharm. and Exper. Therap., vol. III, No. 2, p. 182, June 1954.

LEWIS GOTTS, *Primary Examiner.*

FRANK CACCIAPAGLIA, JR., *Examiner.*

UNITED STATES PATENT OFFICE
CERTIFICATE OF CORRECTION

Patent No. 3,184,382                              May 18, 1965

Joseph C. Calandra

It is hereby certified that error appears in the above numbered patent requiring correction and that the said Letters Patent should read as corrected below.

Column 2, lines 66 to 72, the formula should appear as shown below instead of as in the patent:

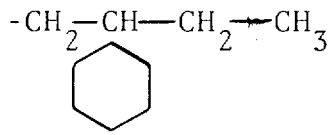

column 8, line 36, in the footnote of Table I, for "does" read -- dose --; line 65, strike out "protected", second occurrence; column 11, line 21, for "patent" read -- patient --; column 12, line 35, for "percent" read -- per second --; column 13, lines 11 to 14, the formula should appear as shown below instead of as in the patent:

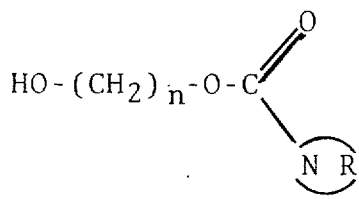

Signed and sealed this 16th day of November 1965.

(SEAL)
Attest:

ERNEST W. SWIDER                    EDWARD J. BRENNER
Attesting Officer                   Commissioner of Patents